(12) United States Patent
Zeng et al.

(10) Patent No.: US 7,751,520 B1
(45) Date of Patent: Jul. 6, 2010

(54) PACKET DETECTION, SYNCHRONIZATION, AND FREQUENCY OFFSET ESTIMATION

(75) Inventors: Chaohuang Zeng, Sunnyvale, CA (US); Jeffrey M. Gilbert, Sunnyvale, CA (US); Won-Joon Choi, Sunnyvale, CA (US); Xiaoru Zhang, Sunnyvale, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 1098 days.

(21) Appl. No.: 10/666,723

(22) Filed: Sep. 17, 2003

(51) Int. Cl.
*H03D 3/24* (2006.01)
(52) U.S. Cl. .............. 375/373; 375/150; 375/343; 375/354; 375/371; 375/375; 455/136; 455/138; 455/513
(58) Field of Classification Search .......... 375/130, 375/131, 140, 150, 152, 316, 317, 340, 343, 375/345, 149, 224, 324, 350, 231, 135–137, 375/146–147, 243, 259–260, 295, 341, 344, 375/354, 220, 267, 371, 375, 373, 377; 455/130, 455/218, 219, 230, 232.1, 136, 513, 138, 455/179
See application file for complete search history.

(56) References Cited

U.S. PATENT DOCUMENTS

| 5,544,167 | A | * | 8/1996 | Lucas et al. ............... 370/342 |
|---|---|---|---|---|
| 5,598,429 | A | * | 1/1997 | Marshall ................... 375/149 |
| 6,724,834 | B2 | * | 4/2004 | Garrett et al. .............. 375/317 |
| 7,012,881 | B2 | * | 3/2006 | Kim ......................... 370/208 |
| 7,039,036 | B1 | * | 5/2006 | Dabak et al. ............... 370/342 |
| 7,123,744 | B2 | * | 10/2006 | Muratani et al. ........... 382/100 |
| 7,324,665 | B2 | * | 1/2008 | Rohaly ...................... 382/107 |
| 2002/0183027 | A1 | * | 12/2002 | Husted et al. .............. 455/219 |
| 2003/0058966 | A1 | | 3/2003 | Gilbert et al. .............. 375/326 |
| 2004/0042536 | A1 | * | 3/2004 | Rowitch et al. ............ 375/150 |
| 2004/0071200 | A1 | * | 4/2004 | Betz et al. .................. 375/152 |
| 2004/0120409 | A1 | * | 6/2004 | Yasotharan et al. ........ 375/260 |
| 2004/0136531 | A1 | * | 7/2004 | Asano et al. ............... 380/202 |
| 2004/0146091 | A1 | * | 7/2004 | Chang et al. .............. 375/147 |
| 2004/0235439 | A1 | * | 11/2004 | Husted et al. .............. 455/136 |
| 2005/0078649 | A1 | * | 4/2005 | Tehrani et al. ............. 370/343 |
| 2006/0072689 | A1 | * | 4/2006 | Kim et al. .................. 375/343 |
| 2006/0269008 | A1 | * | 11/2006 | Bohnke et al. ............. 375/260 |

OTHER PUBLICATIONS

U.S. Appl. No. 10/666,952, filed Sep. 17, 2003, Choi et al.

* cited by examiner

*Primary Examiner*—Shuwang Liu
*Assistant Examiner*—Hirdepal Singh
(74) *Attorney, Agent, or Firm*—Van Pelt, Yi & James LLP (57) ABSTRACT

Techniques are disclosed for detecting a packet. One technique includes sampling a received signal to produce a sequence of samples wherein the sequence of samples includes a plurality of subsequences of samples; cross correlating the subsequences of samples with a known form of the subsequence to produce cross correlations; self correlating the cross correlations to produce a plurality of self correlations; summing the self correlations; and processing the sum of the self correlations.

10 Claims, 6 Drawing Sheets

Packed Detection Preamble

| -1 | -1 | -1 | 1 | -1 | -1 | 1 | 1 | -1 | 1 | -1 | 1 | 1 | 1 | 1 |
|---|---|---|---|---|---|---|---|---|---|---|---|---|---|---|
| M | M | M | M | M | M | M | M | M | M | M | M | M | M | M |

FIG. 2B

1. Medium Sequence $M_{-26,26}$ = {1+j, 0, 1+j, 0, 1+j, 0, 1+j, 0, 1+j, 0, -1-j, 0, 1+j,
0, 1+j, 0, 1+j, 0, -1-j, 0, 1+j, 0, 1+j, 0, 1+j, 0,
0,
0, -1-j, 0, -1-j, 0, -1-j, 0, 1+j, 0, 1+j, 0, -1-j, 0,
1+j, 0, -1-j, 0, -1-j, 0, 1+j, 0, -1-j, 0, -1-j, 0, 1+j}

PACKET DETECTION, SYNCHRONIZATION, AND FREQUENCY OFFSET ESTIMATION

FIELD OF THE INVENTION

The present invention relates generally to wireless communication. More specifically, packet detection, synchronization, and frequency offset estimation for an extended range mode of an 802.11a and/or 802.11g receiver in the 2.4 GHz and 5 GHz bands is disclosed.

BACKGROUND OF THE INVENTION

The IEEE 802.11a, 802.11b, and 802.11g standards, which are hereby incorporated by reference, specify wireless communications systems in bands at 2.4 GHz and 5 GHz. It would be useful if alternate systems could be developed for communication over an extended range or in noisy environments. Such communication is collectively referred to herein as extended range communication. Techniques are needed to achieve packet detection and packet synchronization, which become more difficult for extended range communication. Furthermore, it would be useful if extended range communication could be achieved using the same radio components as are used for a standard 802.11a/g transceiver with the standard allowable frequency offset and other specifications.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1A:
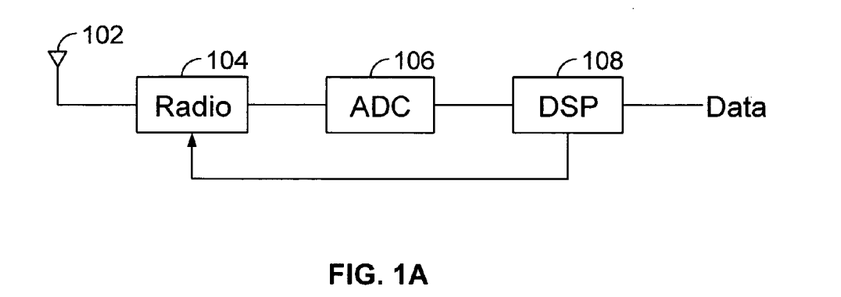
FIG. 1A is a diagram illustrating a wireless receiver.

FIG. 1A is a diagram illustrating a wireless receiver. A signal is received by antenna 102 and processed in the analog domain by radio 104. Generally, radio 104 mixes the signal with a local oscillator to baseband or to an intermediate frequency (IF). Analog to digital converter (ADC) 106 samples the input signal and outputs a digital signal. Digital signal processor (DSP) 108 processes the digital output of ADC 106. DSP 108 may be implemented on a single chip or a set of chips. DSP 108 decodes the signal and also facilitates conditioning the signal. For example, DSP may include an Automatic Gain Control (AGC) processor that determines whether the gain of the signal should be adjusted and outputs a control signal to the radio to adjust the gain of the signal. In various embodiments, the gain is either increased or decreased.

Figure 1B:
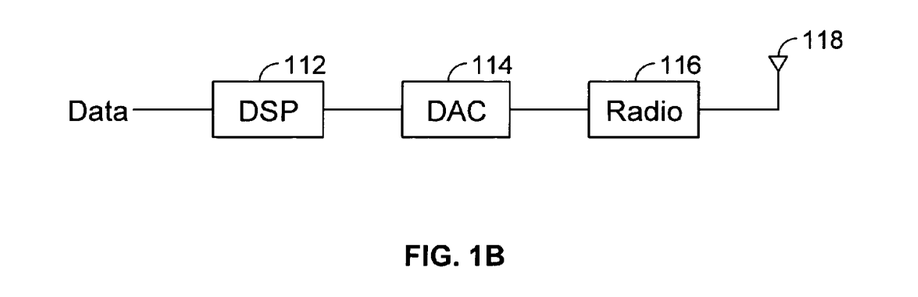
FIG. 1B is a diagram illustrating a wireless transmitter.

FIG. 1B is a diagram illustrating a wireless transmitter. Data is input to DSP 112 which processes the data before it is converted to an analog signal by digital to analog converter (DAC) 114. Radio 116 modulates the signal which is transmitted by antenna 118. Other transmitter and receiver architectures are used in various embodiments as is appropriate. For example, the radio may not be required in some systems and various additional analog processing components may be used.

In the 802.11a standard, a packet preamble is provided that repeats certain known symbols in a manner that enables the packet to be detected and then to be processed. The packet preamble is sufficient to enable a receiver to detect the packet and synchronize when the channel SNR is close to or above the signal to noise ratio (SNR) specified in the standard. However, at extended ranges where the SNR is lower than specified, packet detection and synchronization are more difficult and in some cases cannot be accomplished with the standard preamble. Extended range is achieved by providing a longer preamble having a modified structure and by modifying the processing of the preamble as described below. This enables packet detection, synchronization and frequency offset correction in a system where the SNR is potentially below 2 dB and in some embodiments as low as −10 dB.

Figure 2A:
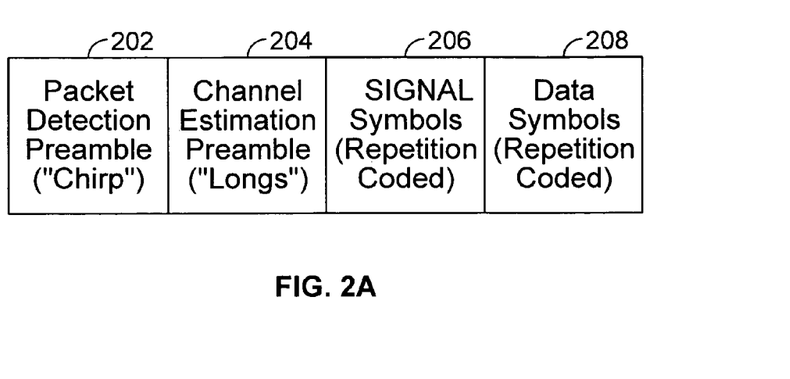
FIG. 2A is a diagram illustrating a packet format used for an extended range mode.

FIG. 2A is a diagram illustrating a packet format used for an extended range mode. The packet includes a packet detection preamble 202, a channel estimation preamble 204, a signal field 206, and a data field 208. A series of medium symbols ("Mediums") are included in the packet detection preamble to enable packet detection, coarse frequency offset calculation and synchronization. A series of long symbols (the "Longs") are included in the channel estimation preamble for channel estimation and fine frequency offset calculation. The signal field includes information about the packet and the data field includes the data payload of the packet.

Packet Detection Preamble

In the 802.11a standard, the packet detection preamble is a series of repeated short sequences ("Shorts"). For an extended range mode where the SNR is below the SNR specified for 802.11a, a longer medium sequence is provided in the preamble. This portion of the preamble is also used by the AGC to properly size the received signal, compute its RSSI, estimate the coarse frequency offset, and compute the DC offset. The packet detection preamble is also sent in isolation as a "chirp" as part of the extended range uplink polling and sent as isolated pairs "double chirp" in random access contention.

Figure 2B:
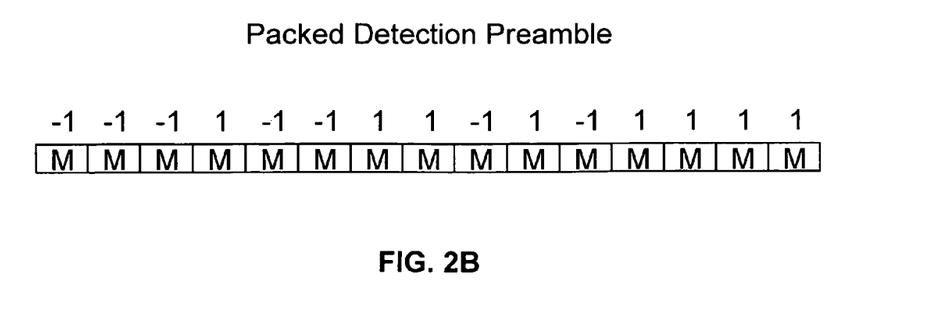
FIG. 2B is a diagram illustrating the packet detection portion of the preamble shown in FIG. 2A.

FIG. 2B is a diagram illustrating the packet detection portion of the preamble shown in FIG. 2A. In the embodiment shown, the packet detection preamble includes a set of 15 medium length symbols ("Mediums") which are symbols of duration 1.6 μs at the base rate (32 samples at Nyquist rate, 64 samples at 2× oversampled rate.) Thus, the total packet detection preamble is 24 μs in duration. In other embodiments, different numbers of Mediums may be included. Preferably, the Mediums are constructed in the frequency domain as a BPSK symbol, similar to the long symbols used for channel estimation ("Longs") or the Shorts used in the 802.11a standard. In addition, the Mediums are designed to minimize their cross correlation with 802.11a Shorts and Longs and to make the Medium's self-correlation as impulse-like as possible.

If the Mediums were repeated in the manner that the Shorts are repeated in the 802.11a standard, then the self correlation of the cross correlation of the series of mediums would yield significant correlation peaks offset 1 Medium period from the correlation peak that should be the largest for the purpose of synchronization. The effect of noise could be that one of the smaller peaks would become the largest, causing an offset error in synchronization. To avoid this, the Mediums are combined with a secondary pseudorandom noise (PN) code. The PN code is illustrated in FIG. 2B by the sign of the numbers shown above each of the Mediums. The sign of each bit in a Medium is either changed or not changed depending on the sign of the portion of the PN code that corresponds to the medium. For example, the signs of the bits of the first three Mediums shown in FIG. 2B would be changed according to the PN code shown and the signs of the bits of the fourth Medium would not be changed. Of course, other PN code sequences may be used and in some embodiments, other types of codes are used.

The 15 PN encoded Mediums thus have different signs such that the offset correlation peaks described above are significantly reduced. The self correlation is large when the entire sequence of PN coded Mediums are aligned and not when there is an integer number of Medium periods offset.

In some embodiments, the Mediums are designed to be repeated and the signal transition between the end of one Medium and the beginning of the next Medium is designed to be smooth. This scheme may be foiled by the PN encoding of the Mediums. In some embodiments, the last sample of one medium is averaged with the first sample of the following medium to reduce abrupt transitions caused by the sign changes.

Figure 3:
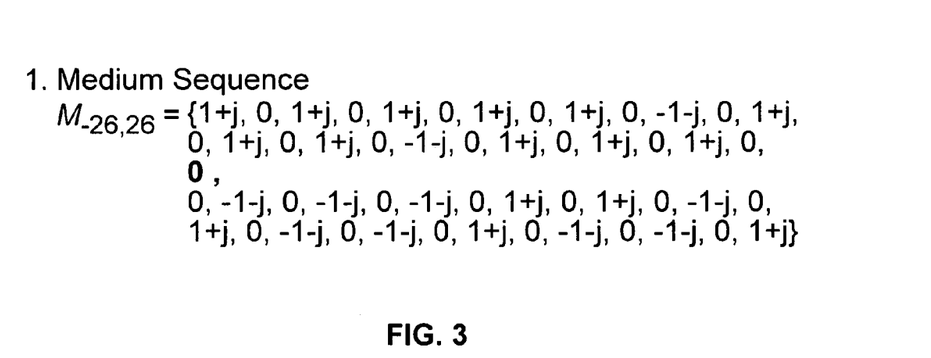
FIG. 3 shows a sequence used in one preferred embodiment to generate a Medium.

FIG. 3 shows a sequence used in one preferred embodiment to generate a Medium. In different embodiments, other sequences are used.

In extended range mode, the preamble must be detected in conditions where the SNR is very low. Cross correlation with the known Medium is used to increase the likelihood of successfully detecting the Medium. The preamble detection cross-correlates the input signal with a single medium and then self-correlates the result over a gap of the duration of a medium (1.6 μs in base mode). This result is then convolved with a 14 impulse train where the signs of the impulses correspond to 1's where two consecutive mediums in the training sequence have the same sign and −1 where the signs differ. The convolution compensates for the PN encoding of the Mediums.

In some embodiments, a very long sequence that is as long as all of the Mediums combined could be used as the packet detection preamble and the received signal could be cross correlated with the known sequence. However, using such a long symbol requires significantly more hardware to implement. The technique of combining multiple Mediums having different signs as a result of the PN coding has the advantage of computational simplicity because only medium length sequences are used while still providing a large, sharp correlation peak without offset peaks to facilitate reliable detection in a noisy environment.

Processing the Mediums may provide packet detection, synchronization, and coarse frequency offset estimation. For example, in certain extended range mode embodiments, the SNR can be as low as ±9 dB. The cross correlation enables the signal to be detected in such environments. Then the correlated outputs from the cross correlation are self-correlated spaced 64 samples apart. 64 samples corresponds to the length of one medium. In different embodiments, the number of samples may vary according to specific requirements of a given system. The phase of the self-correlated value is used to calculate the frequency offset. In a preferred embodiment, 14 self correlated values with 64 samples apart are added together because they can be added coherently. The phase of the sum of the self-correlation values is used to estimate the coarse frequency offset. Synchronization is improved by encoding the Mediums using a PN sequence as described above. In the receiver, the self-correlation value is descrambled by multiplying the differential value of the PN sequence before summing the self correlated values. As a result, the peak of the sum of the self-correlated values reliably indicates the correct symbol boundary, even in the presence of noise.

Figure 4:
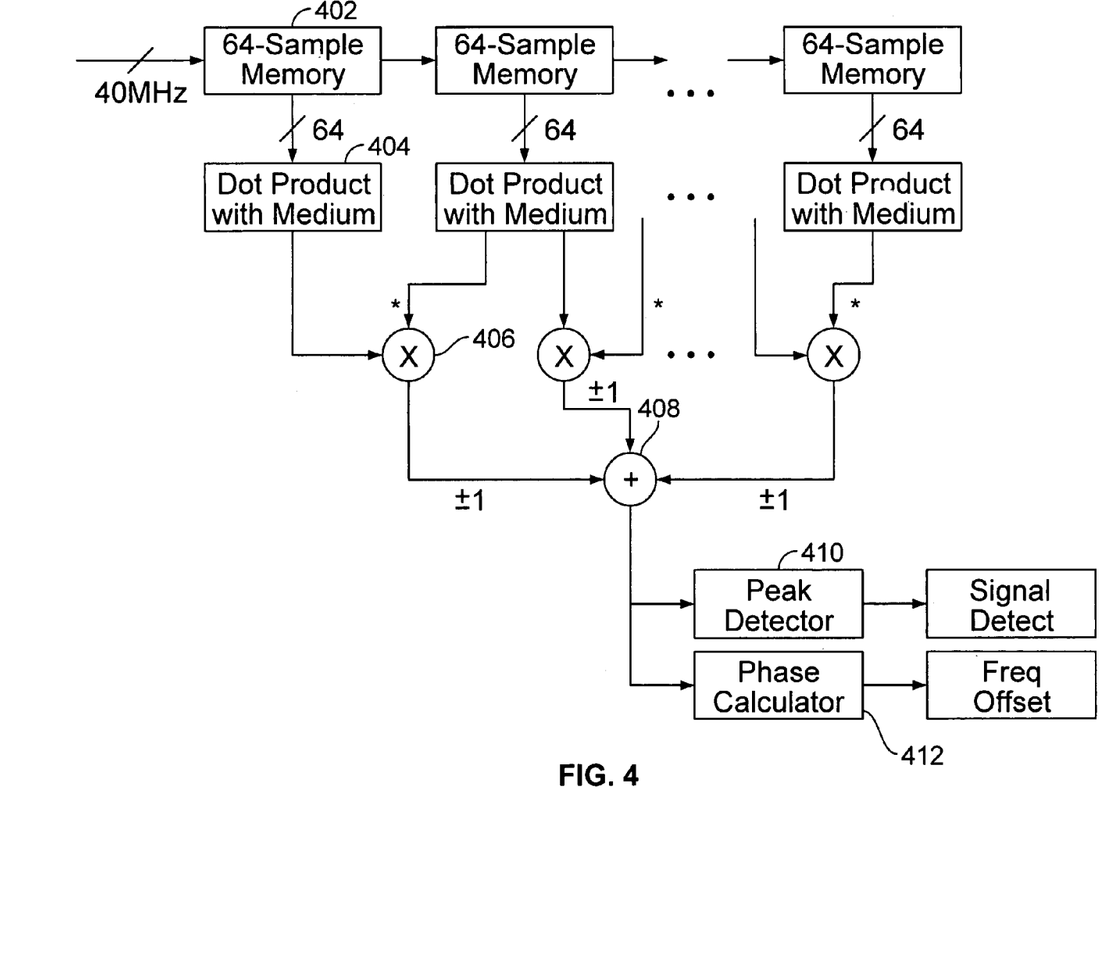
FIG. 4 is a diagram illustrating how Mediums are processed in one embodiment to detect the preamble, synchronize, and compute a frequency offset.

FIG. 4 is a diagram illustrating how Mediums are processed in one embodiment to detect the preamble, synchronize, and compute a frequency offset. The received signal is converted down to baseband and digitized. DC offset is removed and the resulting 40 MHz sampled signal is input to a series of 64 sample memories 402, each sized to hold the 64 samples corresponding to the length in samples of a single Medium. Dot product processors 404 compute the dot products of the samples in each of the memories with the known Medium to compute the cross correlation as the samples are shifted over time as new samples are input. The self correlation of each of the cross correlations is computed by multipliers 406. The outputs of the multipliers are multiplied by the appropriate sign to compensate for the PN coding of the Mediums and input to combiner 408. After the multiplication, the 14 values are summed together. Since the frequency offset is constant in such a short time, the 14 values are summed coherently. The phase of the sum can be used to calculate the frequency offset. The output of combiner 408 is processed by peak detector 410 to determine if a signal is present. The exact location in time of the peak is used to synchronize timing and determine the packet boundary. Phase calculator 412 uses the phase of the peak self-correlation value to calculate the coarse frequency offset. In some embodiments, multipeak aggregation precedes both the peak detector and the phase calculator and both operate off the multipeak signal. The output of the phase detector and/or the peak detector may additionally be fed back to the multipeak aggregator. Variations of this architecture are implemented in other embodiments, and in some cases, peak detection and phase detection may be implemented after multipeak aggregation.

Figure 5:
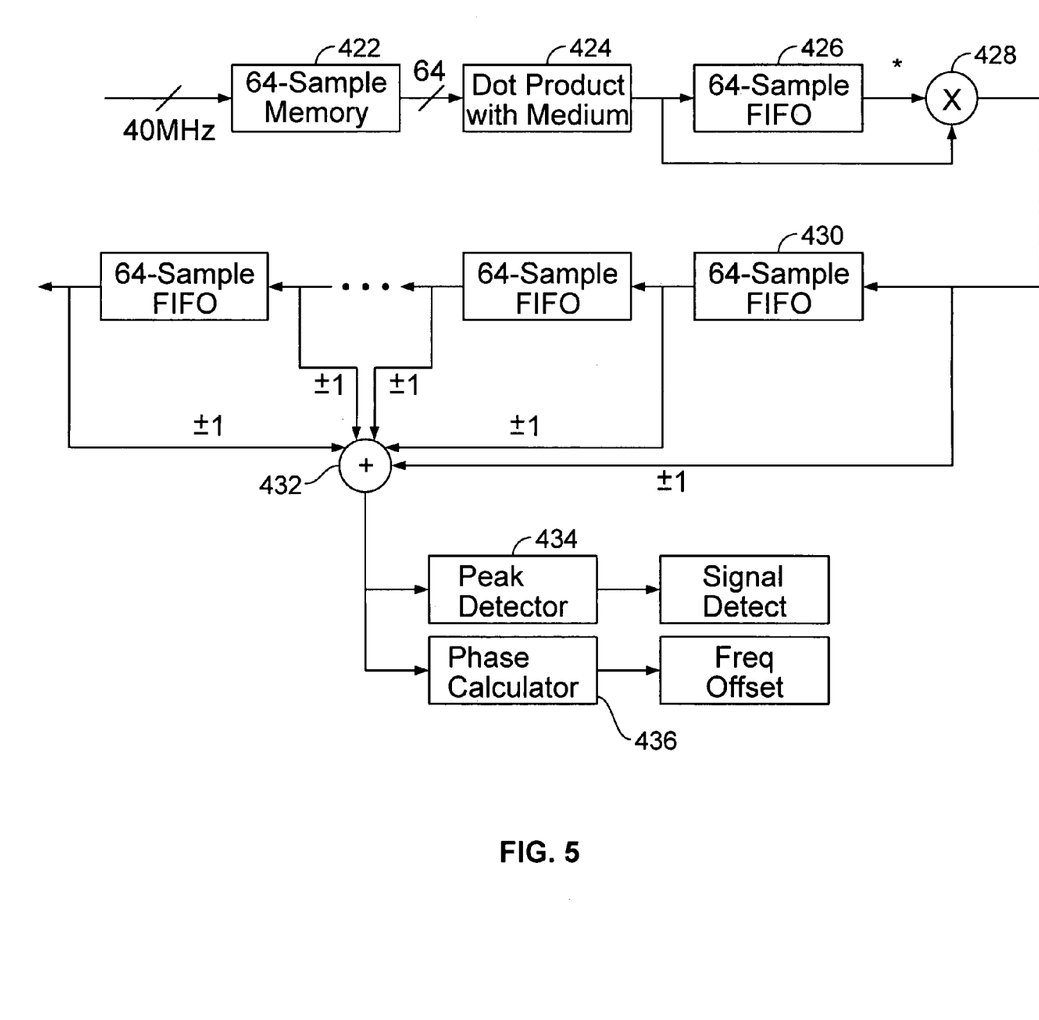
FIG. 5 is a diagram illustrating a more efficient hardware implementation for processing the Mediums.

FIG. 5 is a diagram illustrating a more efficient hardware implementation for processing the Mediums. DC offset is removed and the resulting 40 MHz sampled signal is input to a single 64 sample memory 422, sized to hold the 64 samples corresponding the length in samples of a single Medium. Dot product processor 424 computes the dot product of the samples in memory 422 with the known Medium to compute the cross correlation as the samples are shifted over time as new samples are input. The cross correlation is input to a 64 sample FIFO buffer 426 and is also fed forward to a multiplier 428. The output of the FIFO buffer is also input to the multiplier so that the self correlation of successive Mediums is calculated. The self correlations are output to a series of FIFO buffers 430 that store the results and the self correlations are summed by adder 432. Since the frequency offset is constant in such a short time, the 14 values are summed coherently. The phase of the sum can be used to calculate the frequency offset. The output of adder 432 is processed by peak detector 434 to determine if a signal is present. The exact location in time of the peak is used to synchronize timing and determine the packet boundary. Coarse frequency offset processor 436 uses the phase of the peak self-correlation value to calculate the coarse frequency offset.

DC control and scaling are implemented in some embodiments to reduce the number of bits required to quantize the received signal. The received signal is averaged over a number of samples (meas_len) and power is estimated after the number of samples as follows:

$$dc\_est = \sum_{i=m}^{m+meas\_len-1} y(i)$$

$$power\_est = \sum_{i=m}^{m+meas\_len-1} |y(i)|^2 - |dc\_est|^2$$

where y(i) is the received signal samples. The estimated DC offset and power values are used for the next meas_len samples to subtract the DC offset and scale the signal to a certain range.

Since the hardware area to implement the cross-correlation with a medium sequence is relatively large, the smallest number of bits to quantize the received signal is desirable without sacrificing the performance. Therefore, the signal is re-scaled to a more constant standard deviation based on the measured power. As a result, only 3 bits are needed to quantize the received signal in one preferred embodiment.

Figure 6:
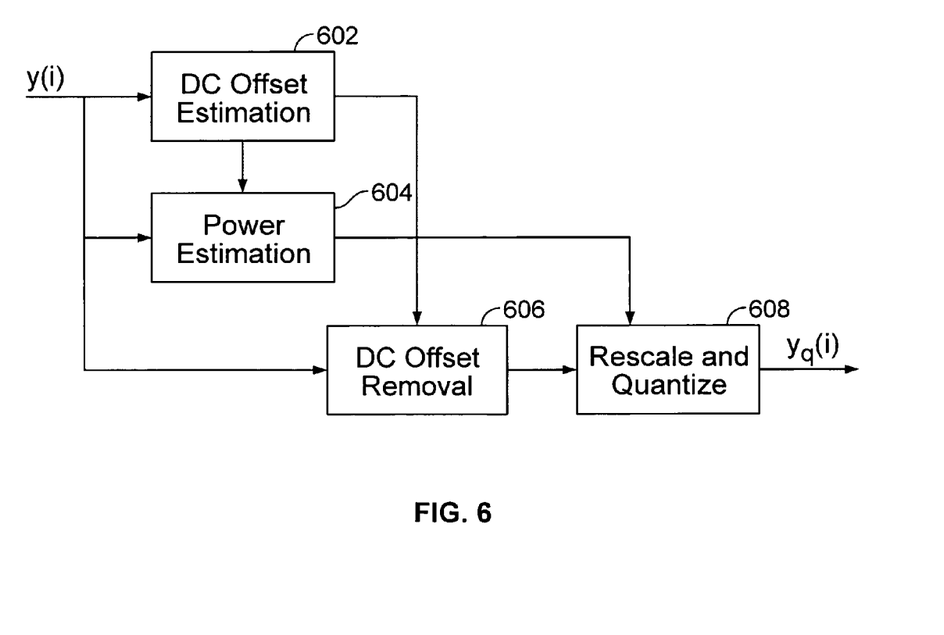
FIG. 6 is a diagram illustrating a system for DC offset removal signal rescaling.

FIG. 6 is a diagram illustrating a system for DC offset removal signal rescaling. DC offset estimation processor 602 and power estimation processor 604 calculate DC offset and power according to the formulas described above or other appropriate measure. The output of DC offset estimation processor is used by DC offset removal processor 606 to remove the DC component of the signal. Likewise, Rescaler 608 causes the power of the signal to be more constant.

The magnitude of the summed self correlation is compared to a threshold to determine whether a signal has been detected. In one embodiment, there is only one threshold for signal detection. If the absolute self-correlation value is above the threshold, then a packet is detected. The threshold is set according to the tradeoff between the sensitivity and the false detection rate. In this design, the default threshold is chosen such that the false detection rate is about once every 4 ms.

If a packet is detected, the next step is to find the symbol boundary to provide synchronization. Because of the scrambling sequence on top of medium sequence, the self-correlation value is maximum only at the last sample of the header where the local mapping sequence (medium sequence scrambled by a PN sequence) is perfectly aligned to the transmitted sequence. In other words, the point where the self-correlation value is maximum is also the symbol boundary.

Unfortunately, it is impossible to know what is the maximum peak without global knowledge of the magnitude of the sum of the self correlations. Therefore, during the search process, every current peak above the threshold is deemed as the largest peak and the symbol boundary is found accordingly. Then the downstream baseband processing is initiated to start decoding the packet. In the mean time, the search for peaks continues. If a larger peak is found, the downstream baseband receiver is reset and that peak is considered as the largest peak. After the first peak is found, the search window for the potential largest peak is set equal to the length of the header.

In a multipath environment, the symbol boundary is not as clear as in the AWGN channel. Nevertheless, the largest peak is deemed as the symbol boundary. For relatively high SNR (larger than −3 dB), the peak usually corresponds to the peak of the channel response. However, in a low SNR scenario, the peak may correspond to the second or the third peak of the channel response.

In low SNR and large RMS delay spread multipath environment, the self-correlation value may not be large enough to exceed the threshold value set in the single peak detection scheme. The multipath channel spreads a large self-correlation value into several smaller self-correlation values, compared to a AWGN channel. Therefore, two thresholds are used in this detection scheme. First, within a given small window, denoted as win_size, (for example, 30 samples in 40 MHz), self-correlation values whose magnitudes are above a first threshold are summed. Second, the magnitude of the sum is compared to the second threshold. If the sum is larger, then a packet is detected. The first threshold is smaller than the threshold in the single peak detection case. However, it is large enough such that it is greater than most noisy self-correlation values.

Alternatively the sum of the magnitudes of the self-correlation values within a given small window that are above a first threshold are summed. Second, the sum of the magnitudes is compared to the second threshold. If the sum is larger, then a packet is detected. The magnitude function can be replaced by the maximum of the magnitude of real and the magnitude of the imaginary parts to reduce computational complexity.

Similarly to single peak detection, the first sum that passes threshold is not necessary the largest one. Therefore, the search process continues after the packet is detected. It ends when it reaches the end of the search window which is generally set to about the length of the header.

The symbol boundary detection for a multipath environment is a little bit different from the single peak detection. The sample where the sum is maximum does not necessarily correspond to the peak of the self-correlation value. After the "maximum" sum is found, it the maximum self-correlation value within the search window is found. The position for the maximum self-correlation value is considered to be the symbol boundary.

It should be noted that the packet detection processing of the preamble operates continuously. In parallel with the packet detection processing of the packet detection preamble, an automatic gain control (AGC) processor monitors the input signal and may adjust the gain by attenuating the signal if a strong signal is detected. This would occur, for example, if a transmitter happens to be close to the receiver. The AGC gain change could happen in the middle of the header. If the AGC gain change happens before the extended range header detection finds the packet, then the header detection resets and ignores everything that happened before the gain change is settled. The detection circuit uses zeros as the input of the cross-correlation for those samples that were received before the gain change. In some embodiments, if the packet detection processor finds a packet before the AGC effects a gain change, the packet detection processor may send a signal to the AGC to limit or prevent any subsequent gain change.

It is particularly advantageous that packet detection proceeds before the AGC has necessarily settled. Conventional systems wait until gain control is implemented before packet detection. Under the disclosed scheme, if the signal is small, gain control (attenuation) will not be required and more samples will be utilized for packet detection. If gain control in the form of attenuation is implemented, then the signal is presumably strong and packet detection can be reset since fewer samples should be required to detect the packet anyway.

Packet detection, synchronization, and frequency offset estimation for an extended range mode of an 802.11a/g receiver in the 2.4 GHz and 5 GHz bands is disclosed. The techniques described herein are applicable to other receivers operating in other bands as well. Although the techniques have been described in the context of being an extended range mode of an 802.11a or 802.11g receiver, the techniques may be used to extend the range of other wireless systems or to advantageously implement a normal range mode in the 802.11a and 802.11g systems. In addition, the various techniques may be applied to signals processed by a radio at baseband or IF or before down conversion. The techniques further may be practiced separately or in combination as desired.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of detecting a packet comprising:
    sampling a received signal to produce a sequence of samples wherein the sequence of samples includes a plurality of subsequences of samples;
    cross correlating each of the plurality of subsequences of samples with a known form of a subsequence to produce at least one cross correlation for each of the plurality of subsequences of samples, wherein the known form of the subsequence is adjusted in sign according to a pseudorandom sequence;
    self correlating the cross correlations to produce a plurality of self correlations; summing the self correlations, including adjusting the sign of each of the plurality of self correlations according to a known sequence that corresponds to the pseudorandom sequence; and
    detecting a packet at least in part by processing the sum of the self correlations;
    wherein processing the sum of the self correlations includes comparing for a period of time the magnitude of the sum of the self correlations to a first threshold and summing the sums of the self correlation whose magnitudes exceed the first threshold and comparing the magnitude of summed sums to a second threshold.

2. A method of detecting a packet as recited in claim 1 wherein processing the sum of the self correlations includes determining a frequency offset from the phase of the sum of the self correlations.

3. A method of detecting a packet as recited in claim 1 wherein processing the sum of the self correlations includes determining a packet boundary based on the time when the sum of the self correlations is determined to be a maximum.

4. A method of detecting a packet as recited in claim 1 further including resetting the sum of the self correlations to zero upon the occurrence of an automatic gain control adjustment.

5. A method of detecting a packet as recited in claim 1 further including resetting upon the occurrence of an automatic gain control adjustment.

6. A method of detecting a packet as recited in claim 1 further including determining a frequency offset from the angle of the sum of the self correlations.

7. A method of detecting a packet as recited in claim 1 further including rescaling the received signal to reduce the number of bits required for cross correlation and self correlation.

8. A method of detecting a packet comprising:
    sampling a received signal to produce a sequence of samples wherein the sequence of samples includes a plurality of subsequences of samples;
    cross correlating each of the plurality of subsequences of samples with a known form of a subsequence to produce at least one cross correlation for each of the plurality of subsequences of samples, wherein the known form of the subsequence is adjusted in sign according to a pseudorandom sequence;
    self correlating the cross correlations to produce a plurality of self correlations;
    summing the self correlations, including adjusting the sign of each of the plurality of self correlations according to a known sequence that corresponds to the pseudorandom sequence; and
    detecting a packet at least in part by processing the sum of the self correlations;
    wherein processing the sum of the self correlations includes comparing for a period of time the magnitude of the sum of the self correlations to a first threshold and summing magnitudes of the sum of the self correlation that exceed the first threshold and comparing the summed magnitudes to a second threshold.

9. A method of detecting a packet comprising:
    sampling a received signal to produce a sequence of samples wherein the sequence of samples includes a plurality of subsequences of samples;
    cross correlating each of the plurality of subsequences of samples with a known form of a subsequence to produce at least one cross correlation for each of the plurality of subsequences of samples, wherein the known form of the subsequence is adjusted in sign according to a pseudorandom sequence;
    self correlating the cross correlations to produce a plurality of self correlations;
    summing the self correlations, including adjusting the sign of each of the plurality of self correlations according to a known sequence that corresponds to the pseudorandom sequence; and
    detecting a packet at least in part by processing the sum of the self correlations;
    wherein processing the sum of the self correlations includes comparing for a period of time the greater of the magnitude of the real part of the sum of the self correlations and the magnitude of the imaginary part of the sum of the self correlations to a first threshold and summing greater of the real magnitude and the imaginary magnitudes of the sum of the self correlation that exceed the first threshold and comparing the summed magnitudes to a second threshold.

10. A receiver configured to detect a packet comprising:

an ADC configured to sample a received signal to produce a sequence of samples wherein the sequence of samples includes a plurality of subsequences of samples;

a cross correlator configured to cross correlate each of the plurality of subsequences of samples with a known form of a subsequence to produce at least one cross correlation for each of the plurality of subsequences of samples, wherein the known form of the subsequence is adjusted in sign according to a pseudorandom sequence;

a self correlator configured to self correlate the cross correlations to produce a plurality of self correlations;

an adder configured to sum the self correlations, including adjust the sign of each of the plurality of self correlations according to a known sequence that corresponds to the pseudorandom sequence; and a processor configured to detect a packet at least in part by processing the sum of the self correlations;

wherein processing the sum of the self correlations includes comparing for a period of time the magnitude of the sum of the self correlations to a first threshold and summing the sums of the self correlation whose magnitudes exceed the first threshold and comparing the magnitude of summed sums to a second threshold.

* * * * *